US008660795B2

(12) United States Patent
Shimomura et al.

(10) Patent No.: US 8,660,795 B2
(45) Date of Patent: *Feb. 25, 2014

(54) NAVIGATION APPARATUS (71) Applicant: Denso Corporation, Kariya (JP)

(72) Inventors: Syo Shimomura, Nagoya (JP); Seiji Kato, Toyota (JP)

(73) Assignee: DENSO CORPORATION, Kariya (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/719,470

(22) Filed: Dec. 19, 2012

(65) Prior Publication Data

US 2013/0173158 A1 Jul. 4, 2013

(30) Foreign Application Priority Data

Dec. 28, 2011 (JP) ................................ 2011-288059

(51) Int. Cl.
*G06F 19/00* (2011.01)

(52) U.S. Cl.
USPC ........... 701/533; 701/430; 701/431; 701/432; 701/436; 701/438; 701/446; 701/457; 701/461; 701/467; 701/516; 340/988; 340/990; 340/995.1; 340/995.19; 340/995.2; 342/357.31; 707/769

(58) Field of Classification Search
USPC ......... 701/1, 23, 25, 410, 417, 425, 428, 430, 701/431, 432, 436, 437, 438, 446, 457, 461, 701/467, 516, 532, 533; 340/988, 990, 340/995.1, 995.19, 995.2, 995.21, 995.22; 707/769; 342/357.31
See application file for complete search history.

(56) References Cited

U.S. PATENT DOCUMENTS

| 6,459,387 | B1* | 10/2002 | Kobayashi et al. | 340/988 |
| 7,539,574 | B2* | 5/2009 | Takashima et al. | 701/457 |
| 7,627,420 | B2* | 12/2009 | Ujino | 701/440 |
| 7,792,636 | B2* | 9/2010 | Ujino | 701/439 |
| 2006/0217882 | A1* | 9/2006 | Takashima et al. | 701/208 |
| 2008/0208466 | A1* | 8/2008 | Iwatani | 701/211 |
| 2011/0172913 | A1* | 7/2011 | Nakamura et al. | 701/208 |
| 2012/0197525 | A1 | 8/2012 | Noro et al. | |
| 2012/0232789 | A1* | 9/2012 | Nakamura | 701/430 |
| 2013/0166205 | A1* | 6/2013 | Ikeda et al. | 701/533 |

FOREIGN PATENT DOCUMENTS

| JP | A-H06-088733 | 3/1994 |
| JP | A-2006-125883 | 5/2006 |
| JP | 2013-092458 A | 5/2013 |
| JP | 2013-126788 A | 6/2013 |

OTHER PUBLICATIONS

U.S. Appl. No. 13/537,505, filed Jun. 29, 2012, Tsutsumi et al.

* cited by examiner

*Primary Examiner* — McDieunel Marc
(74) *Attorney, Agent, or Firm* — Posz Law Group, PLC (57) ABSTRACT A navigation apparatus has a road learning function. When a new road is learned and a new road link is connected to one of a map road link present in a ready-made map data and a previously-learned road link, the navigation apparatus designates the one of the map road link and the learned road link as a base link and generates a supplement link that extends along the base link from a base-link-side end point of the new road link to an end point of the base link. The navigation apparatus specifies an entrance link and an exit link connected to a process target point on the guidance route, and determines content of the route guidance by using the base link corresponding to the supplement link when the entrance link or the exit link is the supplement link.

6 Claims, 7 Drawing Sheets

FIG. 3A
BEFORE LEARNING

FIG. 3B
LEARNED ROAD DETECTING

FIG. 3C
SUPPL-LINK GENERATING

FIG. 3D
SIMPLIFY

NAVIGATION APPARATUS

CROSS REFERENCE TO RELATED APPLICATION

The present application is based on Japanese Patent Application No. 2011-288059 filed on Dec. 28, 2011, disclosure of which is incorporated herein by reference.

TECHNICAL FIELD

The present disclosure relates to a navigation apparatus that performs a route guidance based on a map data, and in particular a navigation apparatus that learns a new road absent in a ready-made map data based on a travel trace of a vehicle.

BACKGROUND

For adding a new road to a map data used in a navigation apparatus, a map manufacturer edits and adds a road data with map edit software and performs a full update or an increment update of the map data. For this updating, measurement vehicles dedicated to the map manufacturer travel and collect a road data, and thereafter, the map manufacturer makes a map data for several months and then distributes the map data to users. Thus, it takes a long time to collect the road data and create the map data. This long time degrades freshness of the ready-made map data because of a real-world change in road feature.

In this relation, a proposed navigation apparatus learns a new road unregistered in the ready-made map data based on a movement trace of a movable body such as a vehicle and the like (see Patent Documents 1 and 2). A road learning function generates and records a new road (a learned road) absent in the ready-made map data, based on a movement trace from a point where present position of the movable body departs from a prestored road in the map data to a point where the present position of the movable body returns to the prestored road in the map data.

Patent Document 1: JP-H6-887333A
Patent Document 2: JP-2006-125883A

In the road learning, it may be preferable to add a learned road data to a ready-made map data without changing the ready-made map data. This is because once the ready-made map data is changed, it becomes difficult to ensure map data integrity when the map manufacturer performs the incremental update of the ready-made map data.

However, when there is a coexistence of a prestored road in the ready-made map data and the learned road, the guidance at a target point (e.g., an intersection) may become inappropriate depending on a data structure that associates the prestored road and the learned road.

SUMMARY

In view of the foregoing, it is an object of the present disclosure to provide a navigation apparatus that can provide an appropriate guidance at an intersection or the like even when the navigation apparatus employs a technique of adding and using a learned road without changing a ready-made map data.

According to one example of the present disclosure, a navigation apparatus learns a new road absent in a ready-made map data based on travel position of a vehicle and comprises a supplement link generation device, a link specifying device and a guidance determination device. When a new road link representing the new road is connected to one of (i) a road map link, which is a link present in the ready-made map data, and (ii) a previously-learned road link, the supplement link generation device designates the one of the map road link and the previously-learned road link as a base link and generates a new link extending along the base link as a supplement link so that the supplement link extends from a base-link-side end point of the new road link to an end point of the base link. The base-link-side end point of the new road link is a point at which the new road link is connected to the base link. The link specifying device specifies an entrance link and an exit link. The entrance link is a link that is connected to a process-target point and located on an entrance side of the process-target point in a guidance route. The exit link is a link that is connected to the process-target point and is located on an exit side of the process-target point in the guidance route. When at least one of the entrance link and the exit link specified by the link specifying device is the supplement link, the guidance determination device makes a determination as to the route guidance at the process-target point by using the base link corresponding to the supplement link in place of the supplement link. The determination as to the route guidance includes a determination as to whether or not it is necessary to provide bifurcation guidance and a determination as to what and how guidance is to be provided.

There may be a fear that when there is a coexistence of a prestored road in the ready-made map data and a learned road, an inappropriate guidance may be provided at a process-target point such as an intersection and the like depending on a data structure that associates the prestored road with the learned road. In this regard, however, according to the above navigation apparatus, the determination as to the route guidance is made by using the base link corresponding to the supplemental link in place of the supplemental link. Therefore, the guidance at an intersection or the like based on a result of this determination becomes an appropriate guidance even when the navigation apparatus employs the technique of adding and using a learned road without changing a ready-made map data.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
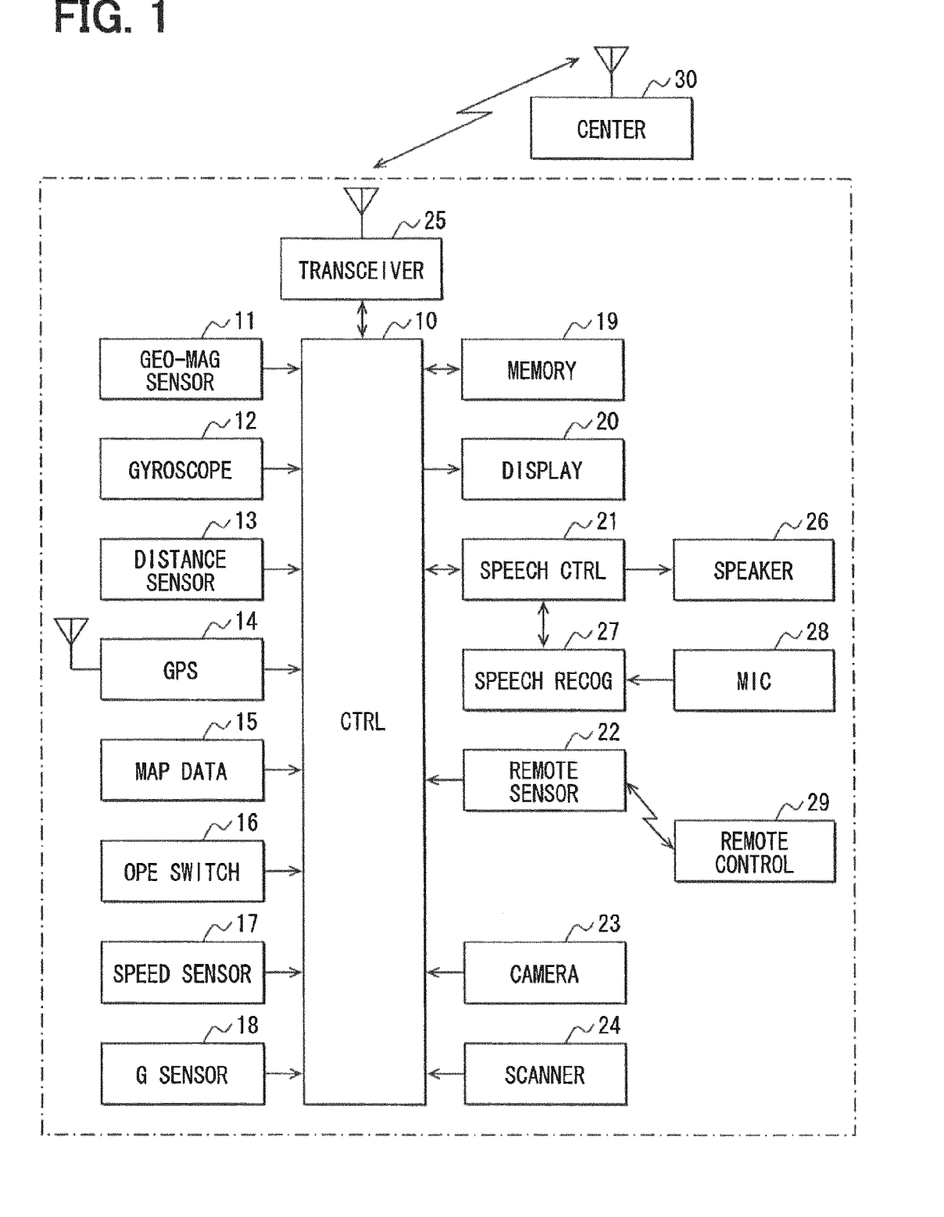
FIG. 1 is a block diagram illustrating a navigation apparatus.

Embodiments will be described with reference to the drawings. A navigation apparatus illustrated in FIG. 1 is mounted to a vehicle and includes a controller 10. The controller 10 may be configured as a computer system including a CPU, a ROM, a RAM, an I/O, and a bus line connecting these components.

A geo-magnetic sensor 11, a gyroscope 12, a distance sensor 13, a GPS receiver 14, a map data input device 15, a group of operation switches 16, a speed sensor 17, a G sensor 18, an external memory device 19, a display device 20, a speech controller 21, a remote control sensor 22, a camera 23, and a scanner 24 are connected to the controller 10.

The geo-magnetic sensor 11 detects orientation of the vehicle based on geomagnetism. The gyroscope 12 outputs a detection signal that depends on an angular velocity of rotation movement of the vehicle. The distance sensor 13 outputs a travel distance of the vehicle. The GPS receiver 14 receives signals from artificial satellites of Global Positioning System (GPS), and detects a coordinate point and an altitude of the vehicle. With these components, the controller 10 can calculate present position, heading direction and speed of the vehicle. Various methods can be used as a method of obtaining the present position based on an output signal from the GPS receiver 14. For example, a single point positioning or a relative positioning may be used.

The map data input device 15 inputs a map data to the controller 10. The map data may be stored in a storage such as a hard disk drive (HDD) and the like and may be inputted to the controller 10 via the map data input device 15. The storage may be other than HDD, and may be CD, DVD-ROM, or the like. The map data includes a road data, a graphic data, a data for map matching, a data for route guidance, and the like. The road data includes a data of nodes and links. The node corresponds to a specific point such as an intersection and the like. The link connects nodes.

The group of operation switches 16 allows a user to input various instructions. The group of operation switches 16 may be provided with mechanical pressing-type switches and/or a touch panel integrated with the display device 20.

The speed sensor 17 detects speed of the vehicle. The G sensor 18 detects acceleration of the vehicle. The external memory device 19 is a storage such as HDD and the like, and is provided to store a data of a learned road acquired in a road learning process. From the external memory device 19, the data of a learned road is inputted the controller 10. When a new road absent in the ready-made map data is detected in the road learning process, a learned road data and a supplement link data associated with the detected new road are generated and stored in the external memory device 19.

The learned road data includes a data of a link and a node of the learned road in respect to attribute and shape. The supplement link data includes a data of supplement link and supplement node. The supplement link specifies a connection state between the learned road and the prestored road. The supplement node is a node at an end of the supplement link.

In navigation-related processes, the supplement link data may be used as an alternative to the road data of the prestored road. Because of this, the prestored road in the ready-made map data and the learned road in the learned road data are logically connected, and it is possible ensure a map integrity with requiring partial update of the ready-made map data.

The display device 20, which may include a liquid crystal display, displays a map and a variety of information. The display device 20 is used to display not only a map image, but also a guidance route, the present position of the vehicle and other guidance informations.

The speech controller 21 controls sound and speech. The speech controller 21 is connected to the speaker 26 for outputting guidance speech. Thus, the speaker 26 can provide information to a user as well as the display device 20 can. The speech controller 21 is connected to a speech recognition device 27 and receives a speech signal of a speech that is inputted from a user via a microphone 28 and recognized by the speech recognition device 27. Because of this, a user can input various instructions in the form of speech.

The remote control sensor 22 receives a signal from a remote control terminal (abbreviated as a remote control) and outputs the received signal to the controller 10. Because of this, a use can input various instructions by using the remote control.

The camera 23 may be a CCD camera or the like. The camera 23 captures a vehicle periphery image. The scanner 24 scans a vehicle periphery. A transceiver 25 performs data communication with an external center 30.

When the vehicle travels an area other than a prestored road (i.e., a road prestored in the ready-made map data) and a previously-registered learned road, the navigation apparatus of the present embodiment performs a road learning operation. Specifically, the navigation apparatus generates the learned road data and the supplement link data based on the movement trace of the vehicle, and records the learned road data and the supplement link data in the external memory device 19. As well as the ready-made map data from the map data input device 15, the controller 10 reads out the learned road data and the supplement link data, and processes the read-out data to ensure a map data integrity and use the processed data in a map display process and a route guidance process.

Figure 2:
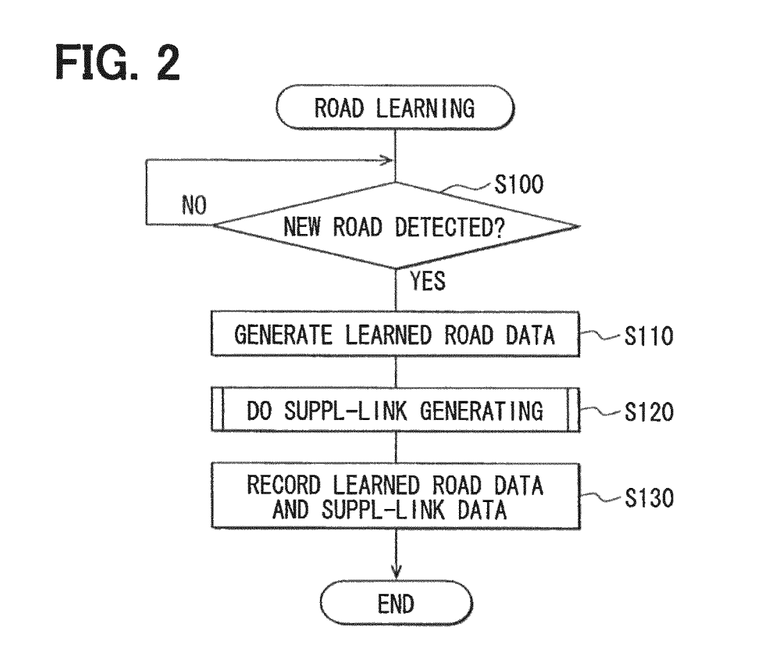
FIG. 2 is a flowchart illustrating a road learning process.

Next, the road learning process will be described. FIG. 2 is a flowchart illustrating the road learning process. The road learning process is performed by the controller 10 when the vehicle is traveling. At S100, the controller 10 determines whether or not a new road is detected. Specifically, the present position of the vehicle is periodically specified. When the present position of the vehicle departs from a map road link present in the ready-made map data or a previously-registered learned road link and thereafter the present position of the vehicle returns to the map road link present in the ready-made map data or the previously-registered learned road link, the controller 10 determines that the new road is detected. In the present disclosure, both of the map road link present in the ready-made map data and the previously-registered learned road link are collectively called an existing link. When the controller 10 determines that the new road is detected (YES at S100), the process proceeds to S110. When the controller 10 determines that the new road is not detected (NO at S100), the controller 10 repeats S100.

At S110, the controller 10 generates a learned road data. Specifically, the controller 10 generates the learned road data based on the movement trace from a departed point to a returned point, where the departed point is a point at which the vehicle departs from the existing link, and the returned point is a point at which the vehicle returns to the existing link. The learned road data includes a learned road link and a learned road node. The learned road link is a link from the departed point to the returned point. The learned road node is at an end of the learned road link. For example, the learned road data includes information indicative of a road connection condition, a set of shape points indicative of a road shape between the departed point and the returned point, and the like.

At S120, the controller 10 performs a supplement link generation process to generate a supplement link data corresponding to the learned road data generated at S110. Now, the supplement link data is described with reference to FIGS. 3A to 3D. In the present disclosure, the existing link serving as a basis for generating a supplement link data is called a base link.

Figures 3A, 3B:
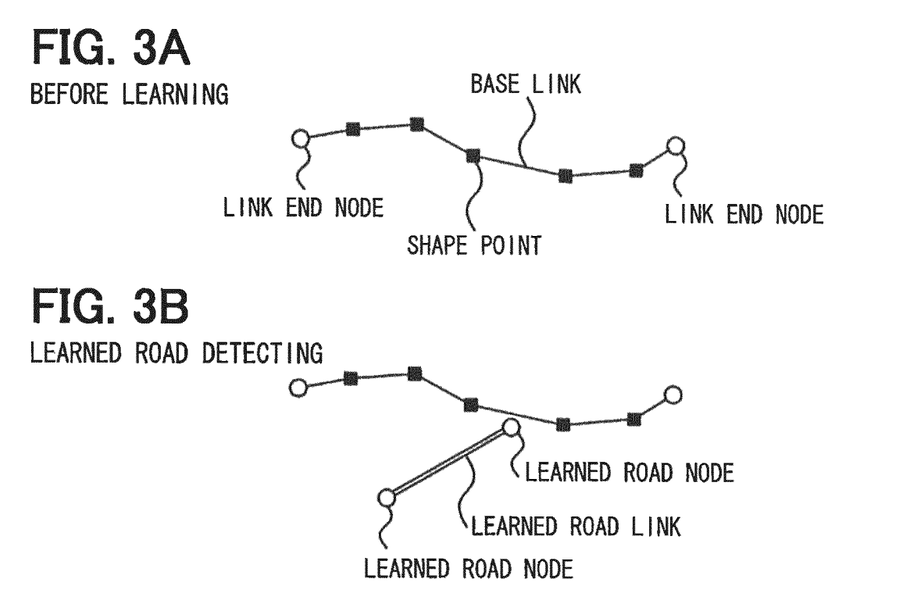
FIGS. 3A to 3D are diagrams illustrating a supplement link generation manner.

FIG. 3A schematically illustrates a base link and a link end node of the base link before the road learning. The base link includes multiple shape points for indicating shape of this road. The data of the base link and the link end node includes an attribute information concerning class, size, connection destination etc. of this road.

FIG. 3B illustrates a situation where a new road connected to a middle of the base link is detected as a new learned road. When the new learned road is detected, a learned road data is generated as illustrated in FIG. 3B. Specifically, the learned road data including (i) the learned road link extending along the movement trace and (ii) the learned road node located at an end of the learned road link is generated.

Figure 3C:
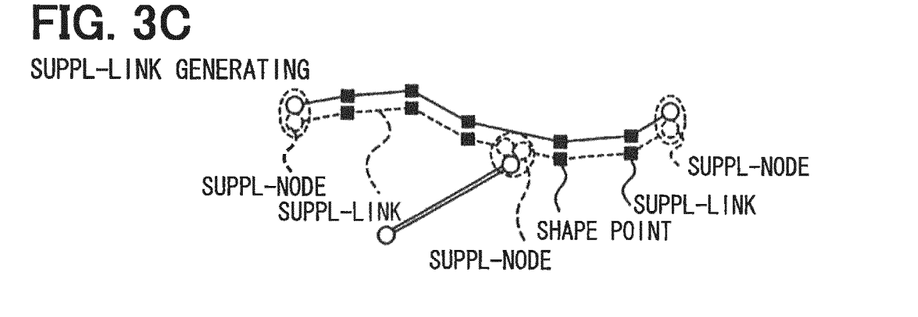

After generating the learned road data, the controller 10 generates a supplement link data based on the base link and the link end node of the base link, as illustrated in FIG. 3C. Specifically, the controller 10 generates the supplement link data in such way that: the data of the base link and the link end node are copied; and the copied base link is divided into supplement links at a point where the base link is connected to the learned road link. The above point connecting the learned road link to the base link corresponds to a location of the learned road node. Note that a supplement node surrounded by the dashed line in FIG. 3C is provided with attribute information for associating the supplement node with other node(s) that is present at the same location as the supplement node.

Figure 3D:
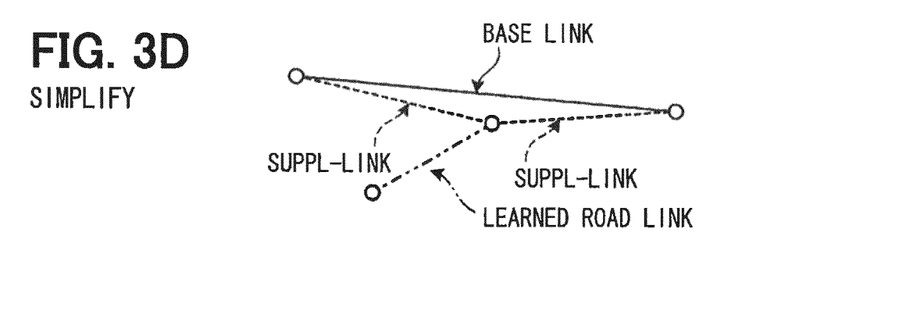
Figure 4:
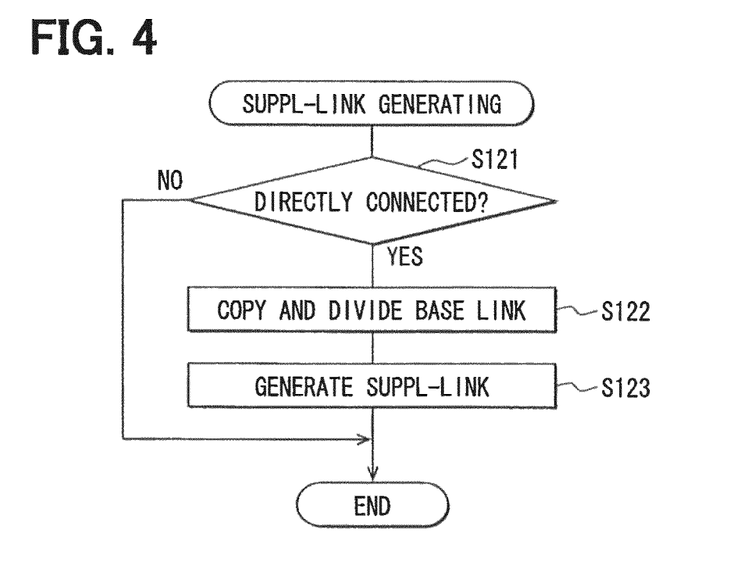
FIG. 4 is a flowchart illustrating a supplement link data generation process.

In FIG. 3D, for simplification, the nodes surrounded by the dashed line in FIG. 3C are depicted as one node, and the shape points are omitted. FIG. 4 is a flowchart illustrating a supplement link data generation process.

At S121, the controller 10 determines whether or not both of two learned road nodes, which are at opposite ends of the learned road link, are directly connected to link end nodes of base link(s). When both of the two learned road node are directly connected to the link end nodes of the base link(s) (YES at S121), the controller 10 ends the supplement link data generation process and does not perform S122 and S123. When at least one of the two learned road nodes is not directly connected to the link end node of the base link (NO at S121), the process proceeds to S122. For example, when at least one of the two learned road nodes is at the middle of the base link (NO at S112), the process proceeds to S122.

At S122, the base link is copied and the copied base link is divided. Specifically, a base link data is copied as a basis of a supplement fink data, and thereafter, the copied base link is divided at the learned road node.

At S123, the controller 10 generates supplement links and supplement nodes as a supplement link data. The supplement links are new links obtained by dividing the base link. The supplement nodes are link end nodes of the supplement links. After S123, the supplement link data generation process is ended.

Explanation returns to FIG. 2. At S130, the learned road data generated at S110 and the supplement link data generated at S120 are recorded in the external memory device 19. After S130, the road learning process is ended. It should be noted that, as described above, the supplement node has an attribute information for associating the supplement node with another node. The supplement link has the attribute information for associating the supplement link with the base link. In the present embodiment, the attribute information of the supplement link includes a link number of the corresponding base link (the associated base link). Thus, the stored supplement link data indicates a correspondence relation between the supplement link and the base link. Therefore, from the correspondence relation, it is possible to specify which base link corresponds to the supplement link. Moe specifically, by referring to the attribute information of the supplement link, it is possible to obtain the link number of the base link.

Figure 5:
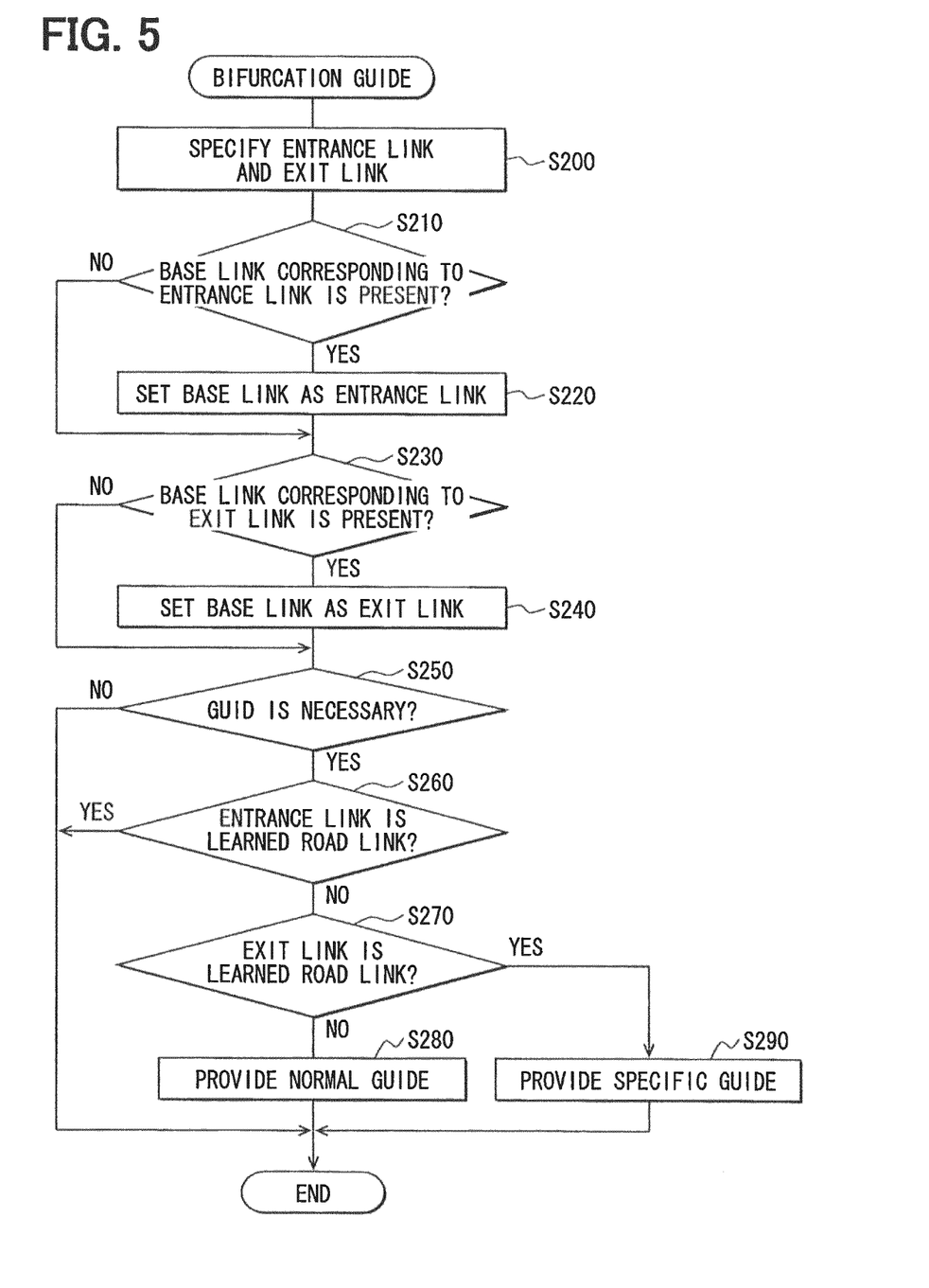
FIG. 5 is a flowchart illustrating a bifurcation guidance process.

On the promise of the road learning process, the navigation apparatus of the present embodiment can provide a bifurcation guidance. FIG. 5 is a flowchart illustrating a bifurcation guidance process. After the guidance route is set by the navigation apparatus, the bifurcation guidance process is performed for each guidance point on the guidance route. The guidance point may be a node (a link end point) representing an intersection or the like. For example, the guidance point may be a node representing a junction of three or more roads, that is, a node at which three or more links are connected. This bifurcation guidance process is performed before the guidance point is reached. When there are multiple guidance points on the guidance route, the bifurcation guidance process is performed for a next guidance point or may be performed for a guidance point one or more after the next guidance point. Additionally, for one guidance point, the bifurcation guidance process may be performed multiple times.

At S200, the controller 10 specifies an entrance link and an exit link. The entrance link is a link that is connected to the guidance point and is located on an entrance side of the guidance point in the guidance route. The exit link is a link that is connected to the guidance point and is located on an exit side of the guidance point in the guidance route. The entrance link and the exit link are connected to the same guidance point. Specifically, of two links connected to the guidance point in the guidance route, one link on the side closer to the vehicle position is specified as the entrance link, and the other link on the side farther from the vehicle position is specified as the exit link. The entrance link and the exit link are specified by using the link numbers assigned to the links.

At S210, the controller 10 determines whether or not the base link corresponding the entrance link is present. When the entrance link is the supplement link, the base link corresponding to the entrance link can be specified from the attribute information of the supplement link. In the generation of the supplement link, the link number of the base link is assigned to the supplement link as the attribute information of the supplement link. Thus, it may be sufficient to determine whether or not the link number of the base link is assigned to the entrance link as the attribute information of the entrance link. When the controller 10 determines that the base link is present (YES at S210), that is, when the entrance link is the supplement link, the process proceeds to S220. At S220, the base link is set as the entrance link, and the process proceeds to S230. When the corresponding base link is absent (NO at S210), the process proceeds to S230 by skipping S220.

At S230, the controller 10 determines whether or not the base link corresponding to the exit link is present. When the exit link is the supplement link, the base link corresponding to the exit link can be specified from the attribute information of the supplement link. In the generation of the supplement link, the link number of the base link is assigned to the supplement link as the attribute information of the supplement link. Thus, it may be sufficient to determine whether or not the link number of the base link is assigned to the supplement link as the attribute information of the supplement link. When the controller 10 determines that the base link is present (YES at S230), that is, when the exit link is the supplement link, the process proceeds to S240. At S240, the base link is designated as the exit link, and the process proceeds to S250. When the corresponding base link is not present (NO at S230), the process proceeds to S250 by skipping S240.

At S250, the controller 10 determines whether or not it is necessary to provide the guidance. When the entrance link and the exit link constitute a road (route) that does not require a vehicle to make a turn into another road, the controller 10 determines that it is necessary to provide the guidance. At S250, when the entrance link or the exit link is the supplement link and there is the corresponding base link, a determination as to whether or not the entrance link and the exit link constitute a road on which the vehicle follow this road without making a turn is made with reference to not the supplement link but the base link. This determination is made by using a map data information that the base link has as the attribute information. Alternatively, this determination is made by determining a road shape with an application program. When the controller 10 determines that it is necessary to provide the guidance (YES at S250), the process proceeds to S260. When the controller 10 determines that it is not necessary to provide the guidance (NOT at S250), the controller 10 ends the bifurcation guidance process without performing subsequent steps.

At S260, the controller 10 determines whether or not the entrance link is the learned road link. When the entrance link is the supplement link and there is the corresponding base link, the controller 10 determines whether or not the base link is the learned road link. When the controller 10 determines that the entrance link is the learned road link (YES at S260), the bifurcation t guidance process is ended without performing subsequent steps. This is because when the entrance link is the learned road link, reliability of bifurcation is low. When the controller 10 determines that the entrance link is not the learned road link (NO at S260), the process proceeds to S270.

At S270, the controller 10 determines whether or not the exit link is the learned road link. Specifically, when the exit link is the learned road link and there is the corresponding base link, the controller 10 determines whether or not the base link is the learned road link. When the controller 10 determines that the exit link is the learned road link (YES at S270), a specific guidance is performed at S270, and then, the bifurcation guidance process is ended. The specific guidance is guidance different from a normal guidance. When the controller 10 determines that the exit link is the learned road link (NO at S270), the normal guidance is performed, and then, the bifurcation guidance process is ended.

The normal guidance is, for example, the guidance about a bifurcation direction at a bifurcation point. For example, "go right", "go left", "go diagonally forward right" or the like may be provided as the normal guidance. The specific guidance is, for example, a notification that the route bifurcates into the learned road link at the bifurcation point. This is because when the exit link is the learned road link, the guidance about a bifurcation direction or the like is less reliable than when the exit link is the map road link. Thus, in one example, a user is notified that the guidance route bifurcates into the learned road link. For example, a message "the route bifurcates into the learned road at the bifurcation point" is notified. In the above, a warning guidance such as "there is the learned road ahead, take care" or the like may be used as the specific guidance.

Figure 6A:
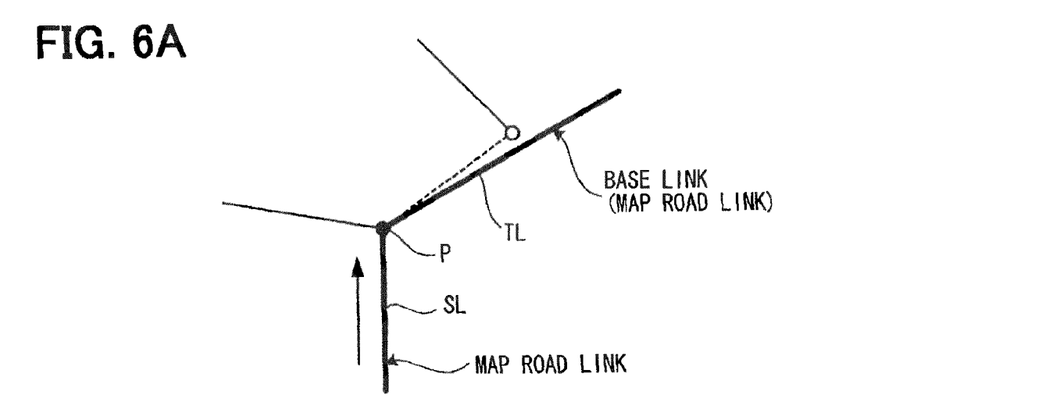
FIGS. 6A to 6C are diagrams illustrating a specific example for explaining the bifurcation guidance process.
Figure 6B:
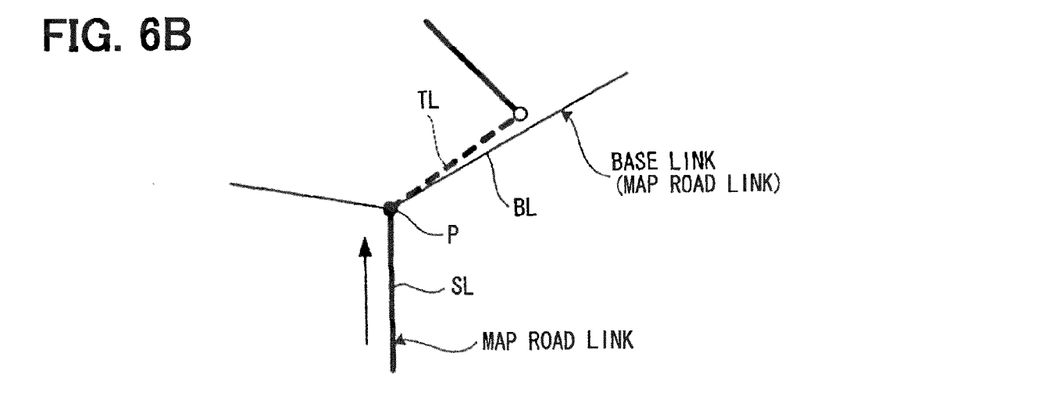
Figure 6C:
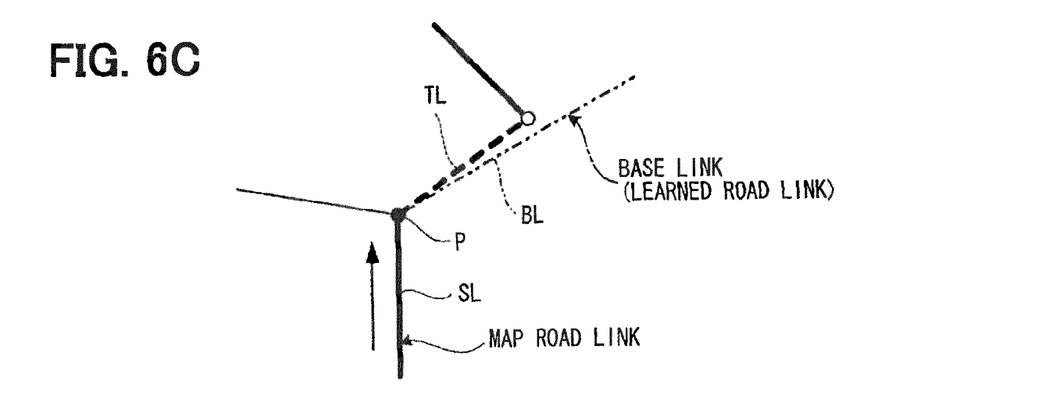

Concrete examples will be described to provide a batter understanding of the bifurcation guidance process. Now, explanation is given on the process for a guidance point P shown as a filled circle in FIGS. 6A to 6C. In FIGS. 6A to 6C, a solid line is the guidance route (set route). Of links of the guidance route connected to the guidance point P, a link closer to the vehicle position is an entrance link SL and a link farther from the vehicle position is an exit link TL. A link shown as a dashed line is the supplement link. A link shown as a two-dot dashed line is the learned road link.

In the case of FIG. 6A, the entrance link SL is a map road link and the exiting link TL is also a map road link, where the map road links are links present in the ready-made map data. That is, the guidance route portions SL and TL on opposite sides of the guidance point P are not the supplement links but the base links. In this case, both of the determinations at S210 and S230 result in negative (NO). Additionally, since neither the entrance link SL nor the exit link TL is a supplement link (NO at S260 and NO at S270), the normal guidance is performed.

In the cases of FIGS. 6B and 6C, the entrance link SL is a map road link and the exit link is a supplement link (the supplement link is shown as a dashed line in FIGS. 6B and 6C). In the cases of FIGS. 6B and 6C, it is determined that the base link BL corresponding to the exit link TL is present (YES at S230), and the base link BL is designated as the exit link (S240).

In FIG. 6B, the base link BL is a map road link. Thus, since the entrance link is not a learned road link (NO at S260) and since the base link BL designated as the exit link is not a learned road link (NO at S270), the normal guidance is performed (S280).

In the FIG. 6C, the base link BL is a learned road link. Thus, since the base link BL designated as the exit link is a learned road link (YES at S270), the specific guidance different than the normal guidance is performed (S290). A reason for performing the specific guidance is that the bifurcation into the learned road link may be less reliable than the route bifurcation into the map road link.

Figure 7A:
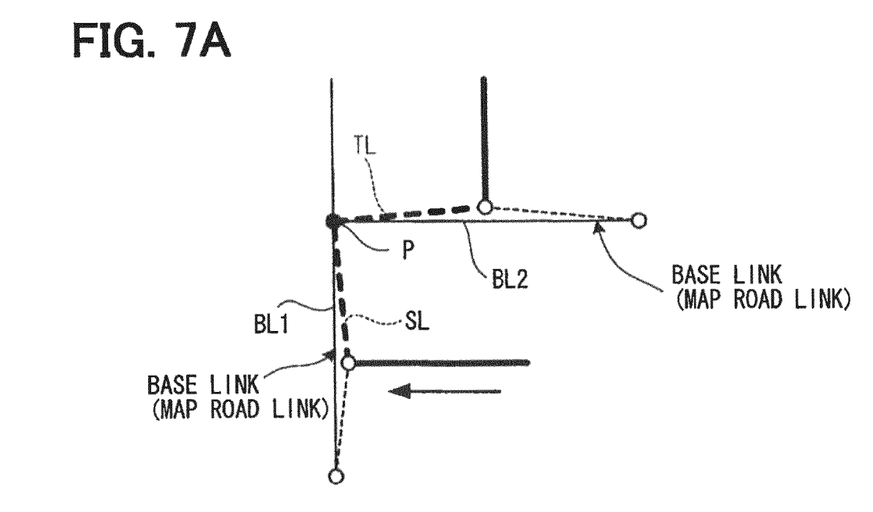
FIGS. 7A and 7B are diagrams illustrating another specific example for explaining the bifurcation guidance process.
Figure 7B:
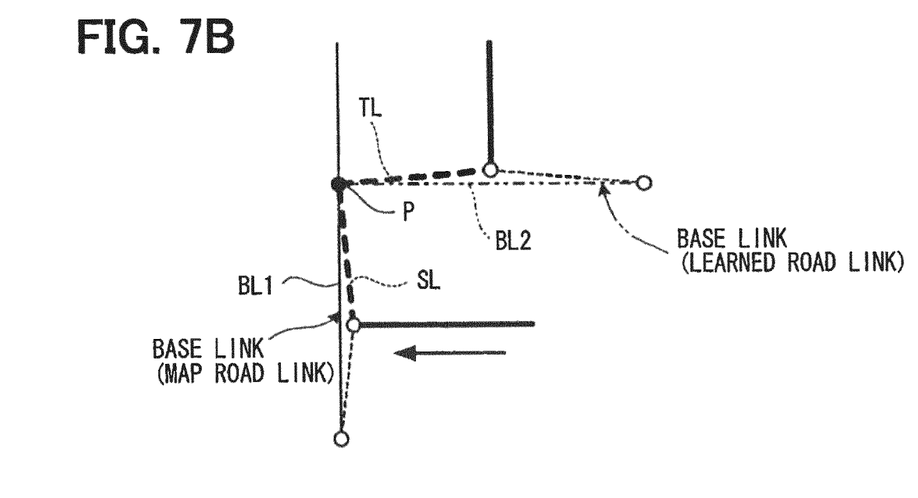

In FIGS. 7A and 7B, a thick sold line represents a guidance route (a set route). Additionally, of two guidance route portions connected to a guidance point P, one link on one side of the guidance point P closer to the position of the own vehicle (i.e., the vehicle equipped with the navigation apparatus) is an entrance link SL, and the other link on the other side of the guidance point P farther from the position of the own vehicle is an exit link TL. Additionally, a link shown as a dashed line is a supplement link, and a link shown as two-dotted dashed line is a learned road link.

In FIGS. 7A and 7B, both of the entrance link SL and the exit link TL are supplement links. In this case, it is determined that the base link BL1 corresponding to the entrance link SL is present (YES at S210), and the base link BL1 is designated as the entrance link. Additionally, it is determined that the base link BL2 corresponding to the exit link TL is present (YES at S230), and the base link BL2 is designated as the exit link.

In FIGS. 7A and 7B, both of the entrance link SL and the exit link TL are supplement links. In this case, it is determined that the base link BL1 corresponding to the entrance link SL is present (YES at 8210), and the base link BL1 is designated as the entrance link (S220). Additionally, it is determined that the base link BL2 corresponding to the exit link TL is present (YES at S230), and the base link BL2 is designated as the exit link (S240).

In FIG. 7A, both of the base links BL1 and BL2 are map road links. Thus, since neither the base link BL1 designated as the entrance link nor the base link BL2 designated as the exit link is the learned road link (NO at S260, NO at S270), the normal guidance is performed.

In FIG. 7B, one base link BL1 is the map road link and other base link BL2 is the learned road link. Thus, since the base link BL2 designated as the exit link is the learned road link (YES at S270), the specific guidance different than the normal guidance is performed (S290). A reason for performing the specific guidance is that the bifurcation into the learned road link may be less reliable than the bifurcation into the map road link.

Figure 8A:
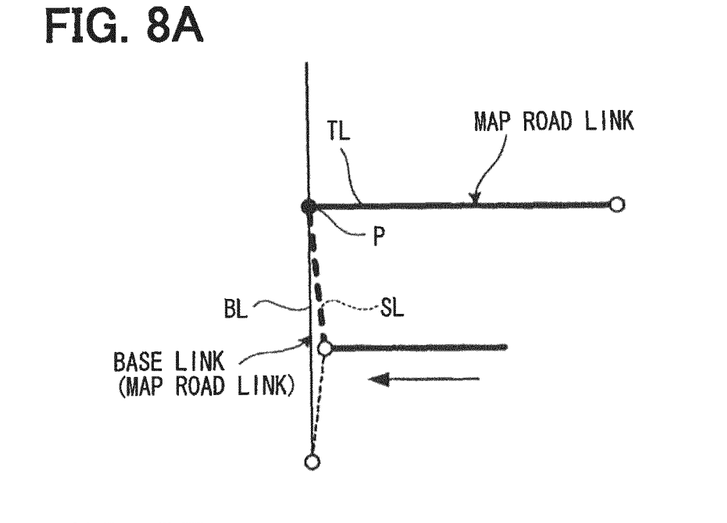
FIGS. 8A and 8B are diagrams illustrating yet another specific example for explaining the bifurcation guidance process.
Figure 8B:
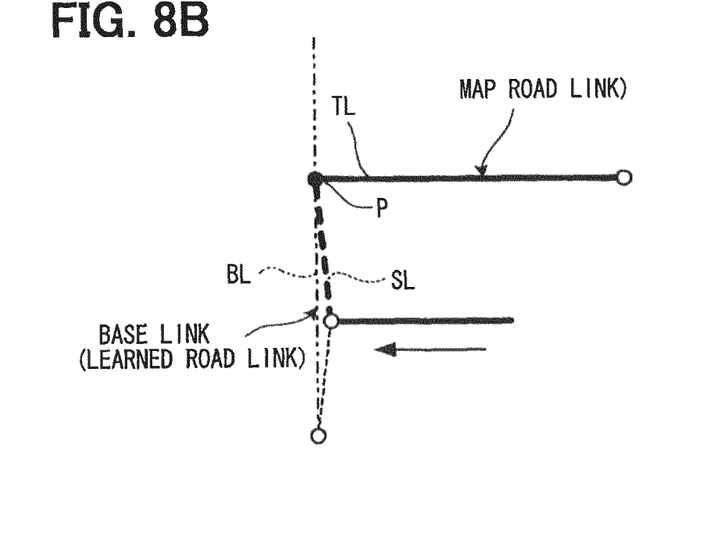

In the cases of FIGS. 8A and 8B, a thick solid line represents a guidance route (a set route). Additionally, of two guidance route portions connected to a guidance point P, one link on one side of the guidance point P closer to the own vehicle position is an entrance link SL, and the other link on the other side of the guidance point P farther from the own vehicle position is an exit link TL. Additionally, a link shown as the dashed line is a supplement link, and a link shown as the two-dotted dashed line is a learned road link.

In FIGS. 8A and 8B, the entrance link SL is a supplement link and the exit link TL is a map road link. In this case, the controller 10 determines that the base link BL corresponding to the entrance link SL is present (YES at S210), and the base link BL is designated as the entrance link (S220).

In FIG. 8A, the base link BL is a map road link. Thus, since the exit link TL is not a learned road link (NO at S260) and since the base link BL designated as the entrance link is not a learned road link (NO at S270), the normal guidance is performed (S280).

In FIG. 8B, the base link BL is a learned road link. Thus, since the base link BL designated as the entrance link is a learned road link (YES at S260), neither the normal guidance nor the specific guidance is performed. A reason for this is that the bifurcation from the learned road link may be less reliable than the bifurcation from the map road link. Additionally, the vehicle had passed through the bifurcation into this learned road link before the bifurcation from the learned road link is reached, and additionally, the specific guidance different from the normal guidance had been performed for the bifurcation into the learned road link.

Now, advantages of the navigation apparatus of the present embodiment will be illustrated. In the present embodiment, when the new learned road is detected, the learned road link is generated based on the travel trace. In this case, the navigation apparatus copies the base link connected to the learned road link, and divides the copied base link at the connection point between the base link and the learned road link, thereby generating supplement links. Then, the navigation apparatus specifies the entrance link and the exit link with respect to the guidance point (S200). When there is the base link corresponding to the entrance link, the navigation apparatus sets the base link as the entrance link. Additionally, when there is the base link corresponding to the exit link, the navigation apparatus sets the base link as the exit link. Based on the above, the navigation apparatus determines whether or not the guidance using the base link is necessary (S250). Based on a result of the determination, the navigation apparatus performs the bifurcation guidance (S280, S290).

Specifically, when the guidance route passing through the supplement link is set, the navigation apparatus uses, in place of the supplement link, the base link corresponding to the supplement link to provide the bifurcation guidance after determining whether to provide the guidance. Therefore, even when the navigation apparatus employs the technique of adding and using the learned road without changing the ready-made map data, the navigation apparatus can provide an appropriate guidance at a guidance point such as an intersection and the like.

In the present embodiment, the determination as to whether or not the guidance is necessary is made based on the determination (S250) as to whether or not the vehicle follows the road without making a turn at the guidance point in the guidance route. In the above, since the determination as to whether or not the vehicle follows the road without making a turn is made by using the base link, it is possible to provide an appropriate guidance.

Moreover, in the present embodiment, when the exit link is the map road link (NO at S270), the normal bifurcation guidance is provided for the bifurcation into the map road link. Therefore, this bifurcation guidance is highly reliable.

When the exit link is the learned road link (YES at S270), the specific bifurcation guidance different from the normal bifurcation guidance is provided (290). Because of this, even when the bifurcation is the bifurcation into the learned road link less reliable than the map road link, the appropriate bifurcation guidance can be provided.

Moreover, in the present embodiment, even when it is determined that the guidance is necessary (S250), as long as the entrance link is the learned road link (YES at S260), the bifurcation guidance is not provided. Because of this, it is possible to properly handle the bifurcation from the learned road link, where the learned road link is less reliable than the map road link.

In the present embodiment, the controller 10 can correspond to a link specifying device or means, a guidance determination device or means, and a bifurcation guidance device or means. Additionally, S200 can correspond to a function of the link specifying device or means. S210 to S250 can correspond to a function of the guidance determination device or mean. S260 to S290 can correspond to a function of the bifurcation guidance device or mean. The guidance point can correspond to a process-target point.

Embodiments of the present disclosure are not limited to the above-illustrated embodiment and can have various forms within the spirit and scope of the present disclosure.

According to the present disclosure, a navigation apparatus can be provided in various forms. For example, according to one aspect, a navigation apparatus learns a new road absent in a ready-made map data based on travel position of a vehicle and comprises a supplement link generation device, a link specifying device and a guidance determination device. When a new road link of the new road is connected to one of (i) a map road link, which is a link present in the ready-made map data, and (ii) a previously-learned road link, the supplement link generation device designates the one of the map road link and the previously-learned road link as a base link and generates a new link extending along the base link as a supplement link so that the supplement link extends from a base-link-side end point of the new road link to an end point of the base link. The base-link-side end point of the new road link is a point at which the new road link is connected to the base link. The link specifying device specifies an entrance link and an exit link. The entrance link is a link that is connected to a process-target point and located on an entrance side of the process-target point in a guidance route. The exit link is a link that is connected to the process-target point and is located on an exit side of the process-target point in the guidance route. When at least one of the entrance link and the exit link specified by the link specifying device is the supplement link, the guidance determination device makes a determination as to the route guidance at the process-target point by using the base link corresponding to the supplement link in place of the supplement link. The determination as to the route guidance includes a determination as to whether or not it is necessary to provide bifurcation guidance and a determination as to what and how guidance is to be provided.

There may be fear that when there is a coexistence of a prestored road in the ready-made map data and a learned road, an inappropriate guidance may be provided at a process-target point such as an intersection and the like depending on a data structure that associates the prestored road with the learned road. In this regard, however, according to the above navigation apparatus, the determination as to the route guidance is made by using the base link corresponding to the supplemental link in place of the supplemental link. Therefore, the guidance at an intersection or the like based on a result of this determination becomes an appropriate guidance even when the navigation apparatus employs the technique of adding and using a learned road without changing a ready-made map data.

The above navigation apparatus may be configured as follows. Except cases where the route guidance at the process-target point is to follow a road without making a turn into another road, the guidance determination device determines that it is necessary to provide the route guidance at the process-target point. When the route guidance at the process-target point is to follow the road without making the turn, the guidance determination device determines that it is unnecessary to provide the route guidance at the process-target point. According to this configuration, when the guidance route is on the supplement link, the determination as to whether or not the guidance is to follow the road is made by using the corresponding base link. Therefore, by performing the guidance based on a result of this determination, it is possible to perform an appropriate guidance at an intersection or the like. In the above, the determination as to whether the route guidance is to follow the road may be made by using at least one of a map data information and a road shape. The map data information may be an attribute of the base link. The road shape may be calculated with an application program.

The above navigation apparatus may be configured as follows. When (i) the exit link is the supplement link and (ii) the base link corresponding to the supplement link is the map road link, the guidance determination device determines that a normal bifurcation guidance should be provided as the route guidance at the process-target point. This is because when the base link is the map road link, the reliability of the bifurcation guidance is relatively high. Therefore, the normal bifurcation guidance based on the above determination becomes an appropriate guidance. The normal bifurcation guidance is, for example, a guidance about a bifurcation direction based on the path shape. For example, "go right", "go left", "go diagonally forward right" or the like may be provided.

When the base link used as a basis for the bifurcation guidance is the supplement link, the reliability of the bifurcation guidance is relatively lower than when the base link is the map road link. In view of this, the above navigation apparatus may be configured as follows. When (i) the exit link is the supplement link and (ii) the base link corresponding to the supplement link is the learned road link, the guidance determination device determines that a specific bifurcation guidance should be provided as the route guidance at the process-target point. The specific bifurcation guidance is distinct from the normal bifurcation guidance in that the specific bifurcation guidance indicates that the guidance route bifurcates into the learned road link. Therefore, the specific bifurcation guidance based on the above determination becomes an appropriate guidance when the route bifurcates into the learned road link less reliable than the map road like. The specific bifurcation guidance is, for example, notifying to a user that the guidance route bifurcates into the learned road link. In another example, the specific bifurcation guidance may be a warning guidance such as "there is the learned road ahead, take care" or the like.

The above navigation apparatus may be configured as follows. When (i) the entrance link is the supplement link and (ii) the base link corresponding to the supplement link is the learned rod link, the guidance determination device determines that it is unnecessary to provide a bifurcation guidance at the process-target point. When the base link corresponding to the entrance link is the learned road link, the reliability of the bifurcation guidance lowers, like when the base link corresponding to the exit link is the learned road link. Additionally, when the base link corresponding to the entrance link is the learned road link, the specific bifurcation guidance directed to the learned load link was previously provided. Thus, when the base link corresponding to the exit link is the learned road link, it is unnecessary to provide the specific bifurcation guidance again. Because of this, it is possible to properly handle the bifurcation from the learned road link, where the learned road link is less reliable than the map road link.

The above navigation apparatus may further comprises a bifurcation guidance device configured to provide bifurcation guidance at the process-target point. According to this configuration, based on a result of the determination of the guidance determination device, an appropriate guidance at an intersection or the like can be achieved in the technique of adding and using the learned road without changing the read-made map data.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A navigation apparatus which learns a new road absent in a ready-made map data based on travel position of a vehicle, the navigation apparatus comprising:
   a supplement link generation device for, in cases where a new road link representing the new road is connected to one of (i) a map road link, which is a link present in the ready-made map data, and (ii) a previously-learned road link,
      designating the one of the map road link and the previously-learned road link as a base link and
      generating a new link extend along the base link as a supplement link so that the supplement link extends from a base-link-side end point of the new road link to an end point of the base link, wherein the base-link-side end point of the new road link is a point at which the new road link is connected to the base link;
   a link specifying device for specifying
      an entrance link, which is a link that is connected to a process-target point and located on an entrance side of the process-target point in a guidance route and
      an exit link, which is a link that is connected to the process-target point and is located on an exit side of the process-target point in the guidance route; and
   a guidance determination device for, in cases where at least one of the entrance link and the exit link specified by the link specifying device is the supplement link,
      making a determination as to the route guidance at the process-target point by using the base link corresponding to the supplement link in place of the supplement link.

2. The navigation apparatus of claim 1, wherein:
   except cases where the route guidance at the process-target point is to follow a road without making a turn into another road, the guidance determination device determines that it is necessary to provide the route guidance at the process-target point; and when the route guidance at the process-target point is to follow the road without making the turn, the guidance determination device determines that it is unnecessary to provide the route guidance at the process-target point.

3. The navigation apparatus of claim 1, wherein:

when (i) the exit link is the supplement link and (ii) the base link corresponding to the supplement link is the map road link, the guidance determination device determines that a normal bifurcation guidance should be provided as the route guidance at the process-target point.

4. The navigation apparatus of claim 1, wherein:

when (i) the exit link is the supplement link and (ii) the base link corresponding to the supplement link is the learned road link, the guidance determination device determines that a specific bifurcation guidance should be provided as the route guidance at the process-target point;

the specific bifurcation guidance is distinct from the normal bifurcation guidance in that the specific bifurcation guidance indicates that the guidance route bifurcates into the learned road link.

5. The navigation apparatus of claim 1, wherein:

when (i) the entrance link is the supplement link and (ii) the base link corresponding to the supplement link is the learned rod link, the guidance determination device determines that it is unnecessary to provide a bifurcation guidance at the process-target point.

6. The navigation apparatus of claim 1, further comprising:

a bifurcation guidance device for providing a bifurcation guidance at the process-target point.

* * * * *